Figure 1:
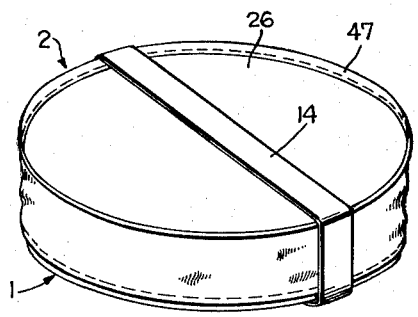

Nov. 20, 1951  N. R. SEAMAN  2,575,893
COLLAPSIBLE, HEAT-INSULATED CONTAINER
Filed Nov. 14, 1949  3 Sheets-Sheet 1

Inventor
NORMAN R. SEAMAN

ATTORNEYS

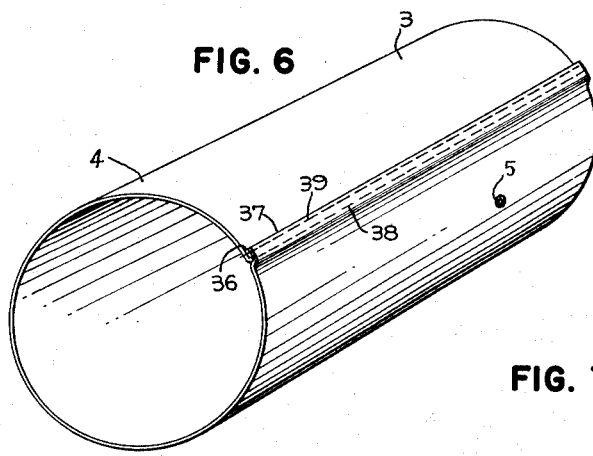
FIG. 6
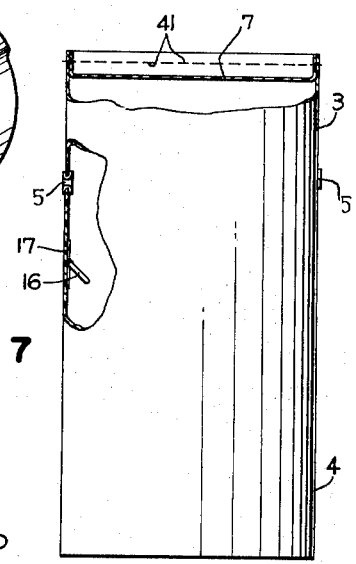
FIG. 7
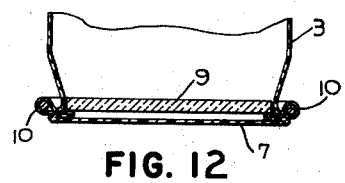
FIG. 12
FIG. 9
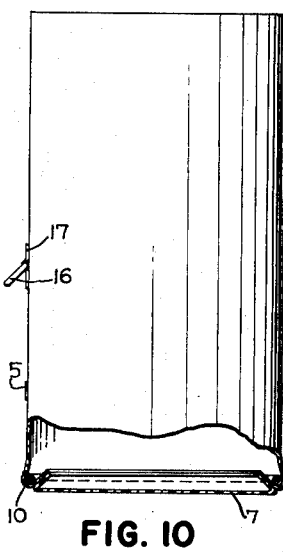
FIG. 10
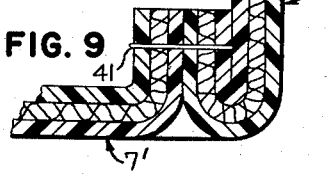
FIG. 8
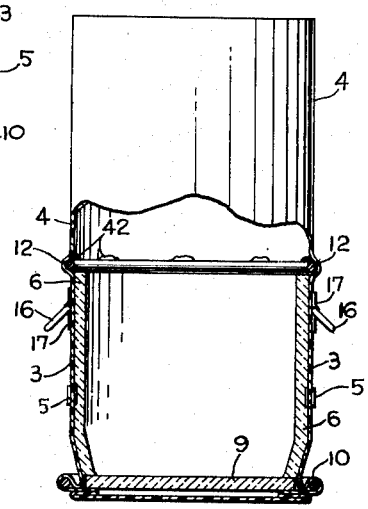
FIG. 13
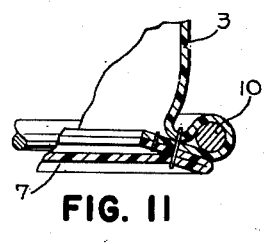
FIG. 11
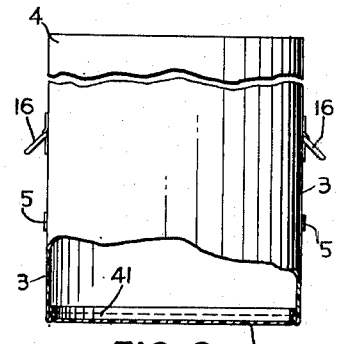
*INVENTOR.*
NORMAN R. SEAMAN
BY
ATTORNEYS

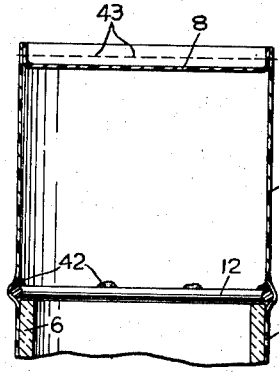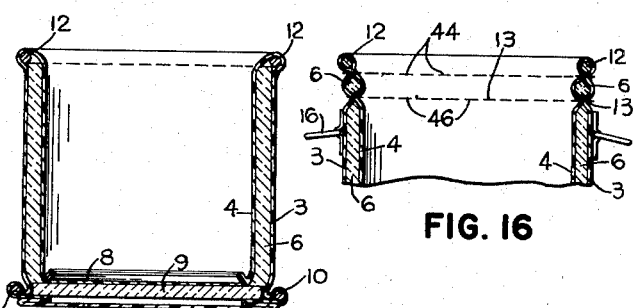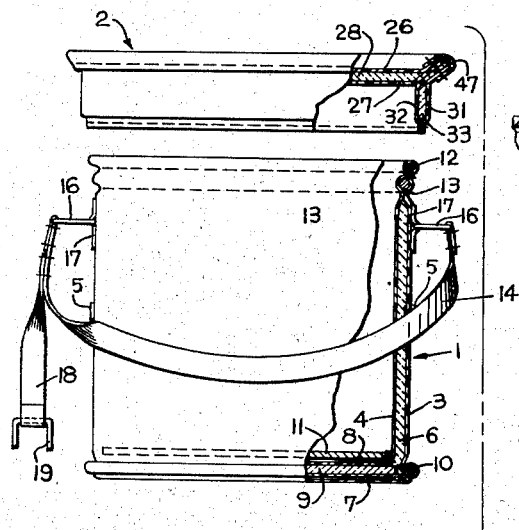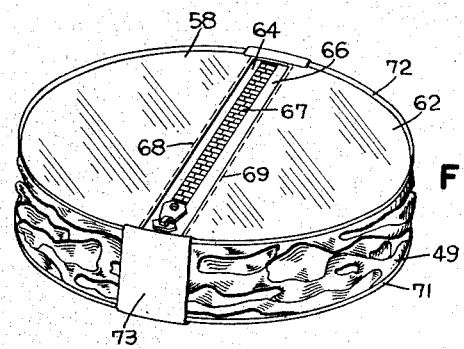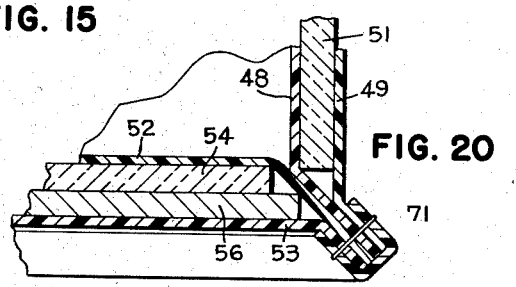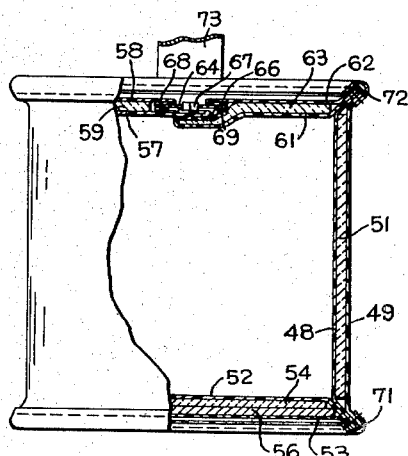

Patented Nov. 20, 1951

2,575,893

UNITED STATES PATENT OFFICE 2,575,893

COLLAPSIBLE HEAT-INSULATED CONTAINER

Norman R. Seaman, Canal Fulton, Ohio

Application November 14, 1949, Serial No. 127,067

8 Claims. (Cl. 150—2.1)

This invention relates to a heat-insulated container and, in particular, to a container which is collapsible, can be carried about, and is adapted to a variety of purposes. Insulated, carrying containers are well known in the art but, for the most part, these have been rigid in form, unwieldy, susceptible to damage, and ill-adapted for storing during periods of non-use. In the carrying of insulated containers in vehicles, for whatever purpose, it is a great convenience to be able to reduce them to small volume when empty, especially when it is desired to keep them in the vehicle at all times.

According to the present invention, I have produced a heat-insulated container which is sufficiently rigid as to be self-sustaining in open condition during periods of service and yet is readily collapsible to a condition of minimum volume. Articles of this general nature are particularly useful to sportsmen, picnickers and sports spectators, and, for users in this category, the container in collapsed condition is adapted for use as a cushion.

It is therefore an object of the invention to provide a heat-insulated container which is collapsible. Another object is to provide a heat-insulated container having flexible walls with sufficient rigidity to stand alone but which yield to manual pressure to collapse to a condition of minimum volume. Still another object is to provide such containers with carrying means which are adapted also to maintain the container in collapsed condition. Other and related objects are to provide a collapsible, heat-insulated container of simple, yet rugged, construction and which shall have a liquid-proof interior surface; to provide a heat-insulating container which shall have flexible side walls so as to be collapsible, but in which the end walls are relatively rigid; and further to provide a heat-insulating container of collapsible structure which is simple and economical to fabricate, light in weight, and resistant to breakage.

Figure 3:
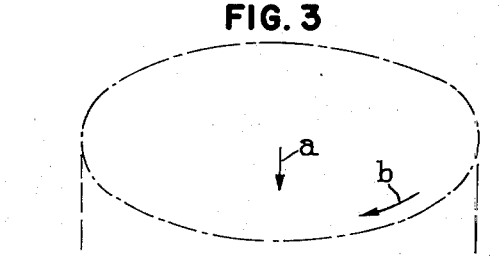
Figure 2:
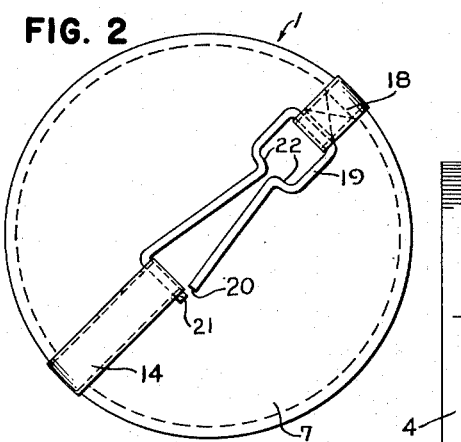
Figure 4:
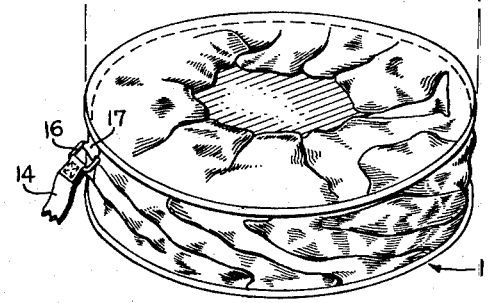
Figure 5:
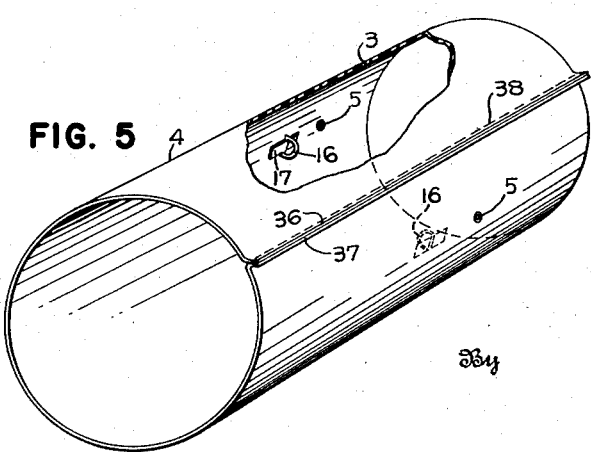

These and other ends, which will be apparent to those skilled in the art, are attained by the invention, certain embodiments of which are described in the accompanying specification and illustrated in the drawings, in which:

Fig. 1 is a perspective view of a preferred form of container, in collapsed condition, and secured in this condition by the bail strap, Fig. 2 is a bottom plan view of the container of Fig. 1, Fig. 3 is a view similar to Fig. 1 with the cover removed, and showing, in broken lines, the outline of the container in erected position, Fig. 4 is a plan view of the blank for the side walls of the container, Fig. 5 is a view in perspective of the blank of Fig. 4, enlarged, as rolled into tubular form and stitched, Fig. 6 is a view similar to Fig. 5 showing a further stitching operation, Fig. 7 is a side elevation of the tube of Fig. 6, showing the addition of an end disc closure, Fig. 8 is a view similar to Fig. 7, showing the tube turned inside out.

Fig. 9 is an enlarged detail of a bottom corner of a container similar to that of Fig. 8, showing a preferred form of sheet material, Fig. 10 is a view similar to Fig. 8 showing the insertion of a wire ring into the tube and lodged at the periphery of the closed end thereof, Fig. 11 is a fragmentary view of the closed end of the tube of Fig. 10 showing a stitching operation which secures the wire ring in place, Fig. 12 is a fragmentary view of the bottom of Fig. 10 showing the insertion of a bottom, heat-insulating disc, Fig. 13 is a view similar to Fig. 10 showing the insertion of an upright, heat-insulating lining and a second wire ring at an intermediate position in the tube, Fig. 14 is an axial sectional view of the upper portion of the tube of Fig. 13, showing the addition of a second end closure, Fig. 15 is an axial section of the tube shown partly in Fig. 14, with the upper half of the tube turned inwardly upon the heat-insulating linings, Fig. 16 is a view of the upper portion of the container of Fig. 15, showing subsequent stitching details, Fig. 17 is an exploded view, in elevation, partly broken away, showing the completed container, its cover and bail, Fig. 18 is a view similar to Fig. 1 showing a modified container, Fig. 19 is an axial section, partly in elevation of the container of Fig. 18, in extended condition, and Fig. 20 is an enlarged, fragmentary view of a detail of the container of Fig. 19.

Referring to the drawings by characters of reference, there is shown, in Fig. 17, a container comprising a main body portion 1 and a cover 2. The container is cylindrical in form, as shown, and the side walls comprise an outer layer 3 and an inner layer 4 with a layer 6 of heat-insulating material between the two. The layer 6 may comprise any suitable material having a low thermal conductivity, but it is preferred to use a fibrous silicate substance known in the trade as "Fiberglas," which contributes to the collapse of the container through its pliability. The layers 3, 4, as will be described, may be formed from a single sheet of material, which material should be both pliable and impermeable to liquids. These layers, or coverings, will comprise a synthetic plastic film material, such as a vinyl plastic, or sheeting of natural rubber. However, it is preferred to use a vinyl-coated fabric or a rubber-coated fabric. This is illustrated in Fig. 9, where the outer layer, shown as a whole by the numeral 3', comprises an outer layer 3a and an inner layer 3b of vinyl plastic, between which is embedded an intermediate layer 3c of fabric. Whatever the constitution of the layers 3, 4, the manner of sealing off of lines of jointure against liquids will be suited to the particular material employed. A pair of grommets 5 are provided in outer layer 3 to vent the space occupied by liner 6 when the container is collapsed or opened. (See Fig. 7.)

The bottom of the container comprises an outer layer 7 and an inner layer 8 of disc form, suitably joined to the respective cylindrical layers 3, 4, in a manner to be presently explained, and which preferably comprise the same material as layers 3, 4. The composition of layer 7' in Fig. 9 is similar to that of composite layer 3' in the same figure. A disc-form layer 9 of "Fiberglas" is contained between layers 7 and 8.

The base of the container is maintained in circular form by means of a wire ring 10 contained within a fold in the outer layer 3 of the side wall at the bottom thereof. Rigidity over the extent of the bottom member and support for enclosed articles are afforded by an inserted disc 11 which may be of a hard, pressed material such as Masonite, or any convenient substance. The upper rim or mouth of the body member 1 is maintained in circular form by means of a wire ring 12 contained between layers 3 and 4, and the layer 6 is maintained in position within the body portion 1 by a peripheral line of stitching as at 13. For a purpose later to be explained, the rings 10 and 12 will have a diameter somewhat in excess of that of the outer diameter of body cylinder 1.

A carrying strap 14 may consist of any suitable material, such as leather, canvas, woven cloth, etc., or may be fabricated from the same material as sections 3, 4. It is desirable, however, that the strap be sufficiently flexible as to be adapted for carrying the container or locking it in collapsed condition, as will be described hereinafter. The strap 14 is secured as by stitching to a pair of rings 16 hingedly carried in anchoring straps 17 secured to the upper part of body portion 1 at diametrically opposite positions. An auxiliary strap element 18 is secured to strap 14 near one end thereof and is looped, at its outer end, through the eye 19 of a bottle opener of generally conventional form. The handle portion of the bottle opener is split, as at 20, to provide a hook element 21 on the cross piece of the base which is engageable through strap 14 as looped and passed around the bottom of the container. The bottle opener is preferably square in cross section so that the shoulders 22 are adequate for purchase under the flange of a crown bottle cap without necessity for the extending ears usually provided in the openers of circular cross-section. In use of the opener, there is no serious wearing action on auxiliary strap 18 since there are no concentrated stresses in that region of the opener.

The cover 2 has a disc-form top with outer layer 26 and inner layer 27 containing between them a heat-insulating pad 28, the materials being similar to that of liners 3, 4 and insert 6, respectively. Similarly, the depending skirt portion of the cover has an outer layer 31, inner layer 32, and insulating layer 33. The latter is relatively thin, since the container body is sufficiently insulated in the region where the skirt fits.

The collapse of the body portion 1 is illustrated in Fig. 3, wherein the full lines show the container (minus the cap) in collapsed condition and the broken lines indicate its position when fully erect. Since the wall of the container has considerable bulk, the collapse is most efficiently accomplished by a combination of collapse in an axial direction and a certain degree of torsion, as indicated respectively by arrows $a$ and $b$ in Fig. 3. The smooth wall of the container thus assumes a series of folds generally helical in form, and a minimum of resistance is encountered in the collapse, and ready retention of the depressed condition results. Furthermore, after one such collapse, the wall is more or less "trained" to a given set of folds, and the ease of collapse is still further enhanced.

I have further found that if the reinforcing rings in the end faces are made of slightly larger diameter than that of the container body 1, the spiral mode of collapse is accomplished with even greater facility.

Collapse is best accomplished with the cover removed and is aided by venting through the grommets 5. After collapse, the cover is placed over the foreshortened container body. Preferably the skirt or flange of the cover will be of a width comparable to the depth of the container in fully collapsed condition, so that all folds in the latter will be enclosed by the skirt.

Locking of the container in its collapsed state is effected by the auxiliary strap portion 18 and the hook 21 of the bottle opener held thereon. As seen in Fig. 2, the portion 18 is turned downwardly and across the bottom 7 and the hook 21 is engaged in strap 14, which is drawn taut across the top, with the excess carried in a double fold downwardly and across the bottom 7 to receive the hook 21. The taut condition of strap 14 across the top is apparent in Fig. 1.

The fabrication of the preferred form shown in Fig. 17 commences with the blank shown in Fig. 4, which comprises a rectangular sheet of material, the two end regions of which, indicated by 3 and 4, are intended to form layers 3 and 4. The region 3 of the blank is perforated to receive grommets 5, and straps 17 with rings 16 are stitched to the sheet or otherwise suitably secured. The sheet is then brought into tubular form, as shown in Fig. 5, by joining the edges 36, 37, and securing as by stitching 38. At this stage the rings 16 are on the inside of the tube. In the next step, shown in Fig. 6, the adjoined edges 36 and 37 are turned down as a unit and stitched to the tube as at 39. Next a bottom closure disc 7 is sewed to one end of the tube, as at 41 (Fig. 7), and the tube is turned inside out, with the result shown in Fig. 8 with the rim of layer 3 now folded inwardly, together with the peripheral edge of disc 7. Next, the ring 10 is inserted within the tube and into the end fold of layer 3, as shown in Fig. 10, and thereafter the layer 3 is stitched to the bottom 7 as shown in Fig. 11, to contain the ring 10. The bottom disc 9 of heat-insulating material is then inserted in the container (Fig. 12), following which the tube-form side wall insulating pad 6 is inserted (Fig. 13), and ring 12 inserted at the top of pad 6, where it may be temporarily secured as by wads of adhesive 42. The upper layer 8 of the bottom is then secured in the upper end of the tube by stitching 43, as shown in Fig. 14. Preferably, this joint will be covered with a suitable cement for liquid-proofing, inasmuch as it occurs in the inner liner where melted ice or other liquid will collect. Waterproofing of the joint at stitching 38, 39 (Figs. 5 and 6) is also desirable for the same reason, at least in the portion 4 (upper part in Fig. 13).

In Fig. 15 the portion 4 is shown turned inwardly of the container to form the inner liner and, in Fig. 16, stitches 44 are shown as securing ring 12 and stitches 46 as securing the upper end of insulator 6 to layers 3 and 4 to maintain its position to these layers. The plate 11 may then be placed in the bottom, the strap 14 stitched to rings 16, and the container section 1 is complete. The straps 14, 18 may be attached at any convenient stage of the process.

The waterproofing in the zone of stitches 43 is considerably facilitated if the free edges of the attached sheets are located on that side of the inner line adjacent the insulation. Therefore, in the modification of Fig. 17 it is contemplated to make the inner liner, comprising sheets 4 and 8, separately from the outer liner, comprising sheets 3 and 7. Fabrication, in this case, involves the same treatment of sheets 3 and 7, ring 10, insulation elements 6 and 9, and ring 12, set forth above. However, sheets 4 and 8 will be joined together as a separate unit, and inserted within liner 6 without being turned inside out. This insertion of the inner liner without reversal and, of course, a line of stitching above ring 12 to connect sheets 3 and 4, preferably capped by a bead, are the only essential departures from the first descried method of fabrication. This affords a narrow circular crevice at the line of stitching 43, which is comparatively easily filled with cement, in contrast to the problem of cementing the protruding free ends of sheets. Not only is this difficult of accomplishment in the first instance, but the cemented sheets are exposed to flexing by contact with articles in the container, and the seal thus subject to deterioration.

In the construction of cover 2, insulating layer 33 is inserted between bands 31 and 32, and the latter stitched together above and below the insulation to form a unitary skirt portion. Likewise, insulating disc 28 is enclosed between discs 26 and 27, which latter are stitched together on a line outside the periphery of the insulating disc. In this unit the peripheries of the discs 26 and 27 extend somewhat beyond the line of stitching and the upper portions of skirt layers 31, 32 also extend somewhat above their upper line of stitching. The extensions of each unit are gathered together and their free edges covered with a bead 47, which is secured by stitching. In general, no liquid-proofing is required in the joints of the cover, but such may be provided if desired.

In use, the container is brought into erect position, in which position it has a tendency to remain. Bottled goods or other items may then be inserted on the rigid bottom 11. If it is desired to maintain the goods at low temperature, ice may be placed in the container in intimate contact with the goods or otherwise. The liquid-proofing of the interior wall will prevent melted ice or liquid from any source from gaining the insulation interiorly of the walls. When the cover is put in place the isolation of the interior is accomplished and the container may then be transported manually by means of the strap or merely left in place, in which case it maintains its erect condition in a satisfactory manner since the wall construction is self-sustaining as to its own weight and that of the cover.

Dispensing is easily accomplished, due to the simply removable and replaceable cover, and the insulating characteristics are no less efficient than those of the conventional rigid containers.

It will be understood, of course, that the container is capable of keeping substances warm as well as cold and, if necessary or desirable, hot water may be placed in the interior to this end. In this regard, the container is particularly useful for the carrying of babies' milk bottles, the relatively light weight and soft, pliable texture being especially noteworthy in an article to be handled by women.

When not in use for carrying purposes, the pouch is easily collapsed, as in Fig. 3, and secured, as in Figs. 1 and 2, to present a very much reduced volume and consequently easy storage, or to serve as a cushion for the user.

In the modification shown in Figs. 18 to 20 there is shown a container of the same general type as in the foregoing description but which has an integral cover, access being had by means of a diametral slit in the top face. Inner and outer sheets 48, 49 of the side wall, stitched into tubular form from rectangular sheets, contain insulating pad 51, and inner and outer disc-form sheets 52, 53 in the base contain a disc 54 of insulating material and a rigid, bracing disc 56. The top closure is divided into two halves. One half comprises inner and outer sheets 57, 58, containing a partial disc 59 of insulating material, and the other half comprises inner and outer sheets 61, 62 containing a partial disc insulator 63. The fabric securing strips 64, 66 of a diametrally located slide-fastener 67 are stitched at 68, 69 to folds on the inner edges of sheets 58, 62 and folds on the inner edges of sheets 57, 61. The latter are somewhat extensive so as to overlap and are lined to thermally insulate the region under the slide-fastener. At the bottom of the container, a bead 71 surrounds the terminal edges of sheets 48, 49, 52 and 53 and is stitched through all four sheets. Similarly, at the top of the container, a bead 72 surrounds the edges of the side sheets and top closure sheets, and is stitched therethrough. The pairs of sheets containing the various insulating pads may be individually stitched together prior to application of the bead to facilitate manipulation in the assembly process. In any case, the interfaces between sheets at the periphery surrounded by bottom bead 71 should be cemented or otherwise rendered liquid-proof, so as to prevent communication of liquid to the insulation in the walls.

A carrying strap 73 is secured at the terminal ends of the slide-fastener 67 in any convenient manner, preferably by underlying the bead 72 and being stitched in place therewith.

The form of Figs. 18 to 20 is collapsible in a straight axial direction, with random folding of the side walls. The absence of a peripheral form-retaining ring in the upper face permits inward deformation thereof in carrying and therefore has a tendency to reduce the bulk and lessen the strain on the carrying strap. Also, the degree of deformability is increased and accommodation in storing in cramped spaces enhanced. The strap, in this form, is turned over to engage the bottom for holding the container in collapsed condition, and will, conveniently, be of a length suitable for this purpose. However, length-adjusting means may be provided on the strap, if desired.

Whereas containers of circular girth have been shown in each case, they may partake of other forms while retaining the important properties of lightness and a flexibility adapted for collapse of the container. The general form may be adapted for a preferred use, as, for instance, in case of the carrying of refrigerated fish, an oblong cross-section, elliptical for instance, would be desirable to achieve maximum storage.

The bottom, especially, of the container may be widely varied. Rigidity in this portion being, in fact, desirable, the bottom part may be constructed along the lines of those of prior art, rigid containers.

While certain preferred embodiments of the invention have been shown, the invention is not limited thereby, since changes in the size, shape and arrangement, for instance, of the various parts may be made without departing from the spirit or scope of the invention as defined in the appended claims.

What is claimed is:

1. A thermally insulating container comprising a bottom section, a side wall and a top section, each having inner and outer envelopes and a liner of heat-insulating material between said envelopes, the envelopes and liner of said side wall section, at least, consisting of pliable material whereby the top section is movable bodily toward the bottom section by deformation of said side wall section, and a carrying handle attached to the upper portion of said container, said handle comprising a main flexible strap with an auxiliary piece having a hook on its free end adapted to be passed around the said bottom section in collapsed condition of the container and the hook engaged in a loop in the main strap, whereby to retain the container in collapsed condition.

2. A thermally insulating container comprising a bottom section, a side wall and a top section, each having inner and outer envelopes and a liner of heat-insulating material between said envelopes, the envelopes and liner of said side wall section, at least, consisting of pliable material whereby the top section is movable bodily toward the bottom section by deformation of said side wall section, and a carrying handle attached to the upper portion of said container, said handle comprising a main flexible strap with an auxiliary piece extending therefrom and fastening means on the said auxiliary piece, the latter being engageable around the said bottom section in collapsed condition of the container and attachable to said main strap, whereby to retain the container in collapsed condition.

3. A thermally insulating container comprising a bottom section and a side wall, each having inner and outer envelopes and a liner of heat-insulating material between said envelopes, the said side wall consisting of foldable material whereby to be movable bodily toward said bottom section, a form-retaining ring attached at the perimeter of said bottom section, and a form-retaining ring attached to the perimeter of said wall section near the top thereof.

4. A thermally insulating container comprising a bottom section and a side wall, each having inner and outer envelopes and a liner of heat-insulating material between said envelopes, the said side wall consisting of foldable material whereby to be movable bodily toward said bottom section, a form-retaining ring attached at the perimeter of said bottom section, and a form-retaining ring attached to the perimeter of said wall section near the top thereof, the enclosed areas of said rings being each greater than the cross-sectional area enclosed by said wall section, whereby torsional deformation of the wall sections is facilitated.

5. The method of making a double-walled, thermally insulated, flexible container which comprises, forming a tube from a flat sheet, attaching a cup-shaped closure at one end of the tube, turning the tube inside out, placing insulating material inside the tube on the said closure and adjacent the walls of the tube to a height medially thereof, attaching a closure to the open end of the tube and turning the thus closed end of the tube into the portion containing the insulating material.

6. The method of making a double-walled, thermally insulated, flexible container which comprises, forming a tube from a flat sheet by stitching, attaching a cup-shaped closure at one end of the tube by stitching, turning the tube inside out, placing a first ring in said tube adjacent said closure, placing insulating material inside said tube on the said closure and adjacent the walls of the tube to a height medially thereof, placing a second ring in proximity to the top of the insulating material adjacent the said walls, attaching a closure to the open end of the tube by stitching, and turning the thus closed end of the tube into the portion containing the insulating material.

7. In the method of claim 6, the step of confining the said first ring by stitching through the wall of the tube and the base.

8. In the method of claim 6, the step of confining the said second ring which comprises stitching together adjacent walls of said tube beneath said ring, and stitching the said insulating material to said walls in the vicinity of said second ring.

NORMAN R. SEAMAN.

REFERENCES CITED

The following references are of record in the file of this patent:

UNITED STATES PATENTS

| Number | Name | Date |
| --- | --- | --- |
| 463,597 | Cussen | Nov. 17, 1891 |
| 1,096,537 | Humphreys | May 12, 1914 |
| 1,431,918 | Arthur | Oct. 17, 1922 |
| 1,691,905 | Gamble | Nov. 13, 1928 |
| 1,895,278 | Crawford | Jan. 24, 1933 |
| 1,949,677 | Crawford | Mar. 6, 1934 |
| 2,087,611 | Wells, Jr., et al. | July 20, 1937 |

FOREIGN PATENTS

| Number | Country | Date |
| --- | --- | --- |
| 813,600 | France | Mar. 1, 1937 |